United States Patent
Raj et al.

(10) Patent No.: US 7,609,620 B2
(45) Date of Patent: Oct. 27, 2009

(54) METHOD AND APPARATUS USING MULTIPROTOCOL LABEL SWITCHING (MPLS) LABEL DISTRIBUTION PROTOCOL (LDP) TO ESTABLISH LABEL SWITCHING PATHS (LSPS) FOR DIRECTED FORWARDING

(75) Inventors: Alex E. Raj, Westford, MA (US); Robert H. Thomas, Lexington, MA (US); Prabhu Vaithilingam, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 526 days.

(21) Appl. No.: 11/203,801

(22) Filed: Aug. 15, 2005

(65) Prior Publication Data

US 2007/0036072 A1 Feb. 15, 2007

(51) Int. Cl.
*G01R 31/08* (2006.01)
*G06F 11/00* (2006.01)
*H04L 12/28* (2006.01)
*H04L 12/56* (2006.01)

(52) U.S. Cl. .................... 370/225; 370/397; 370/395.3; 370/395.5

(58) Field of Classification Search ......... 370/216–228, 370/389, 392, 395.5, 397, 465
See application file for complete search history.

(56) References Cited

U.S. PATENT DOCUMENTS

| 6,373,822 | B1 | 4/2002 | Raj et al. ................ 370/252 |
| 6,408,001 | B1 | 6/2002 | Chuah et al. ............ 370/392 |
| 6,512,768 | B1 | 1/2003 | Thomas .................. 370/389 |
| 6,584,071 | B1 * | 6/2003 | Kodialam et al. ........ 370/238 |
| 6,628,649 | B1 | 9/2003 | Raj et al. ................ 370/360 |
| 6,665,273 | B1 | 12/2003 | Goguen et al. .......... 370/252 |
| 6,721,269 | B2 * | 4/2004 | Cao et al. ................ 370/227 |
| 6,735,190 | B1 | 5/2004 | Chuah et al. ............ 370/352 |
| 6,856,991 | B1 | 2/2005 | Srivastava ............... 707/10 |
| 6,879,594 | B1 | 4/2005 | Lee et al. ................ 370/408 |
| 6,895,441 | B1 * | 5/2005 | Shabtay et al. .......... 709/238 |
| 6,925,081 | B2 | 8/2005 | Meda ..................... 370/392 |
| 6,950,398 | B2 | 9/2005 | Guo et al. ............... 370/235 |
| 6,970,464 | B2 | 11/2005 | Xu et al. ................. 370/392 |
| 7,061,921 | B1 * | 6/2006 | Sheth .................. 370/395.52 |
| 7,133,358 | B2 * | 11/2006 | Kano ..................... 370/221 |

(Continued)

OTHER PUBLICATIONS

Shen, Naimig, Chen, Enke, Tian, Albert, Discovering LDP Next-Nexthop Labels, draft-shen-mpls-ldp-nnhop-label-02.txt, dated May 2005.

(Continued)

*Primary Examiner*—Chi H Pham
*Assistant Examiner*—Warner Wong
(74) *Attorney, Agent, or Firm*—Brinks Hofer Gilson & Lione

(57) ABSTRACT

A method and apparatus method for providing fast rerouting in a network is presented. The method and apparatus assign a first local label for a prefix, and assign a second local label for the prefix. The first local label is advertised to an upstream peer and the second local label is advertised to a downstream peer. A forwarding entry from the first local label for a prefix is switched to the second local label for the prefix when a failure of a link or next hop is detected.

25 Claims, 16 Drawing Sheets

U.S. PATENT DOCUMENTS

| | | | |
|---|---|---|---|
| 7,289,622 B1* | 10/2007 | Liesenberg | 379/221.14 |
| 7,307,991 B2* | 12/2007 | Kubota et al. | 370/392 |
| 7,315,510 B1* | 1/2008 | Owens et al. | 370/218 |
| 7,388,828 B2* | 6/2008 | Nakash | 370/218 |
| 2001/0034793 A1 | 10/2001 | Madruga et al. | 709/238 |
| 2002/0112072 A1* | 8/2002 | Jain | 709/239 |
| 2002/0167895 A1* | 11/2002 | Zhu et al. | 370/216 |
| 2003/0063560 A1* | 4/2003 | Jenq et al. | 370/216 |
| 2004/0071080 A1* | 4/2004 | Uchiyama et al. | 370/225 |
| 2005/0088965 A1* | 4/2005 | Atlas et al. | 370/216 |
| 2005/0094636 A1* | 5/2005 | Lee et al. | 370/389 |
| 2005/0111351 A1* | 5/2005 | Shen | 370/217 |
| 2005/0237927 A1* | 10/2005 | Kano et al. | 370/216 |
| 2005/0270972 A1* | 12/2005 | Kodialam et al. | 370/216 |
| 2006/0013127 A1* | 1/2006 | Izaiku et al. | 370/225 |
| 2006/0034251 A1 | 2/2006 | Sivabalan et al. | 370/351 |
| 2006/0146696 A1* | 7/2006 | Li et al. | 370/218 |
| 2006/0159009 A1 | 7/2006 | Kim et al. | 370/216 |
| 2006/0239266 A1* | 10/2006 | Babbar et al. | 370/392 |
| 2007/0174483 A1 | 7/2007 | Raj et al. | 709/238 |
| 2007/0201355 A1 | 8/2007 | Vasseur et al. | 370/217 |
| 2008/0031130 A1 | 2/2008 | Raj et al. | 370/225 |

OTHER PUBLICATIONS

Wijnands, IJsbrand, Thomas, Bob, Kamite, Yuji, Fukuda, Hitoshi, Multicast Extensions for LDP, draft-wijnands-mpls-ldp-mcast-ext-00-txt, dated Mar. 2005.

Andersson, L., Doolan, P., Feldman, N., Fredette, A., Thomas, B., RFC 3036, The Internet Society, dated Jan. 2001.

Bryant et al., draft-bryant-ipfrr-tunnels-01.txt, dated Oct. 2004, www.ietf.org.

Shand, M., draft-ietf-rtgwg-ipfrr-framework-02.txt, dated Oct. 2004, www.ietf.org.

Alia Atlas, Ed, draft-ietf-rtgwg-ipfrr-spec-base-01.txt, dated Mar. 2005, www.ietf.org.

Pan et al., draft-ietf-mpls-rsvp-lsp-fastreroute-05.txt, dated Nov. 2004, www.ietf.org.

* cited by examiner

METHOD AND APPARATUS USING MULTIPROTOCOL LABEL SWITCHING (MPLS) LABEL DISTRIBUTION PROTOCOL (LDP) TO ESTABLISH LABEL SWITCHING PATHS (LSPS) FOR DIRECTED FORWARDING

BACKGROUND

Computer networks have become ubiquitous. Computer networks include the Internet, Service Provider (SP) networks, enterprise networks, private networks, and Local Area Networks (LANs). A network such as an SP network and enterprise network may include peripherally located Provider Edge (PE) routers, each of which couples to one or multiple Customer Edge (CE) routers. The PE routers are used to maintain routing and forwarding context for each customer. The CE routers may couple to private LANs associated with one or multiple customers. The private LANs are also referred to as core networks. The CE site can be a MAN or WAN as well. The PE routers learn local customer routes from the CE routers and distribute remote customer routes to the CE router. The PEs use Border Gateway Protocol (BGP) to distribute customer routes to each other. To support operation, the PE routers typically maintain Virtual Routing and Forwarding (VRF) information in a table (a VRF table) dictating how to route and forward traffic through the shared physical network to support corresponding Virtual Private Networks (VPNs) for the different customers. For the core network, an ingress PE uses BGP functions to determine the egress PE. For example, the ingress PE puts the packet in a two-level Multi Protocol Label Switching (MPLS) stack. The top label is used to tunnel packets to the egress PE to accomplish MPLS forwarding through the core network. The bottom label is used by the egress PE to identify either the outgoing FIB rewrite adjacency or VRF table for another lookup In the event of a failure of a device or link that is part of a network, network packets are dropped. In order to overcome this, various techniques are used to determine the location of the failure and to adapt the network to work around the failure. For example, after a failure is detected, the LFIB tables of the various routers may need to be modified to point to corresponding VRFs for lookup and switch back to an alternative PE. This working around the failed device or link may involve waiting for routing to reconverge and possibly directing traffic that normally transits the failed device onto an alternate path until routing (directed forwarding). Directed forwarding may be performed in different ways for different applications.

Conventional Label Distribution Protocol (LDP) operates to create a Label Switching Path (LSP) for a prefix that follows the normally routed path to the prefix. LDP performs local label assignment by assigning a local label L to each prefix. LDP then advertises its local label for a prefix to all of its peers and learns a label from each of its peers for the prefix. LDP installs its local label for a prefix and the label (Lp) learned from the peer selected by routing as next hop for the prefix into MPLS forwarding data structures. This results in a forwarding entry for the prefix LSP of the form of:

$L \rightarrow Lp$, int_p

Where L is the local label, Lp is the prefix and label learned from a peer and int_p is the interface. This causes the router to forward labeled packets arriving with top of stack label L by swapping label Lp for L and sending the resulting packet out interface int_p. When routing specifies multiple next hops LDP installs the labels learned from each of the next hops.

In the conventional backup path selection mechanisms, link state routing protocols and Shortest Path First (SPF) are used to compute the backup path. This provides the backup rewrite as follows:

$L \rightarrow Lb$, int_b

Where L is the local label, Lb is the prefix and backup label learned from a peer and int_b is the backup interface. This causes the router to forward labeled packets arriving with top of stack label L by swapping label Lb for L and sending the resulting packet out interface int_b when the primary rewrite $L \rightarrow Lp$, int_p is not available.

SUMMARY

Conventional mechanisms such as those explained above suffer from a variety of shortcomings. One such shortcoming is that in conventional networks, directed forwarding is typically limited to within an area of the enterprise or service provider networks. Another shortcoming is that there is no mechanism to compute the backup path in the case of non-link state routing protocols.

Embodiments of the invention significantly overcome such deficiencies and provide mechanisms and techniques that provide a method and apparatus using multiprotocol label switching (MPLS) label distribution protocol (LDP) to establish LSPs for directed forwarding.

LDP performs local label assignment by assigning local labels to prefixes. LDP then advertises its local labels for prefixes to its peers and learns the labels its peers have assigned to prefixes. LDP programs LSP forwarding information for prefixes by installing its labels and the labels learned from its peers for prefixes into MPLS forwarding data structures.

LDP is normally used to establish LSPs that follow paths determined by IP routing. Embodiments of the present invention utilize LDP to signal both an LSP for a prefix that follows the normally routed path for the prefix and an LSP that follows an alternate or backup path. Label forwarding data structures are programmed to support both LSP's for a prefix.

In a particular embodiment of a method for providing fast rerouting in a network, the method includes assigning a first local label for a prefix, and assigning a second local label for the prefix. The method further includes advertising the first local label to an upstream peer and advertising the second local label to a downstream peer. A forwarding entry from the first local label for a prefix is switched to the second local label for the prefix when a failure of a link or next hop is detected.

Other embodiments include a computer readable medium having computer readable code thereon for providing fast rerouting in a network. The computer medium includes instructions for assigning a first local label for a prefix, and instructions for assigning a second local label for said prefix. The medium further includes instructions for advertising the first local label to an upstream peer and for advertising the second local label to a downstream peer.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides fast rerouting in a network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing fast rerouting in a network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide methods and apparatus for performing LDP fast reroute by enabling routers to establish alternate path LSPs to destinations. The present invention works with link state and non-link state routing protocols, works across routing areas, and provides excellent protection.

In a particular embodiment of a method for performing fast rerouting in a network, a device performs local label assignment by assigning two local labels (Lr, La) for a prefix. Lr is used for the normally routed LSP and La is used for the alternate path LSP. LDP advertises one of Lr or La to each of its peers. LDP advertises label Lr to every peer that is not a routing next hop for the prefix and label La to every peer that is a routing next hop.

Since LDP advertises only a single label for the prefix to each peer it learns only a single label for the prefix from each peer. Note that when LDP learns a label from a peer it need not know whether the peer advertised an Lr or La label. LDP installs local label Lr for the normally routed path for the prefix and La for the alternate path as follows:

LDP installs Lr and the label learned from the peer selected by routing as next hop for the prefix as it normally does. This results in a forwarding entry for the normally routed LSP of the form:

Lr→Lpr, int_pr where Lpr is the label advertised by the peer selected by routing as the next hop and int_r is the outgoing interface.

LDP installs La and the label learned from the peer that it chooses as the next hop for the alternate path for the prefix.

This results in a forwarding entry for the alternate path LSP of the form:

La→Lpa, int_pa where Lpa is the label advertised by the peer selected as the next hop for alternate path LSP and int_pa is the outgoing interface to reach the alternate path next hop.

An example is presented to illustrate the method described above for establishing normally routed and alternate path LSPs. LDP includes a path vector with every label mapping message and follows normal procedures governing the use of path vectors. The path vector specifies the path that will be taken by MPLS packets forwarded to the advertising router with the label it advertises.

Figure 1:
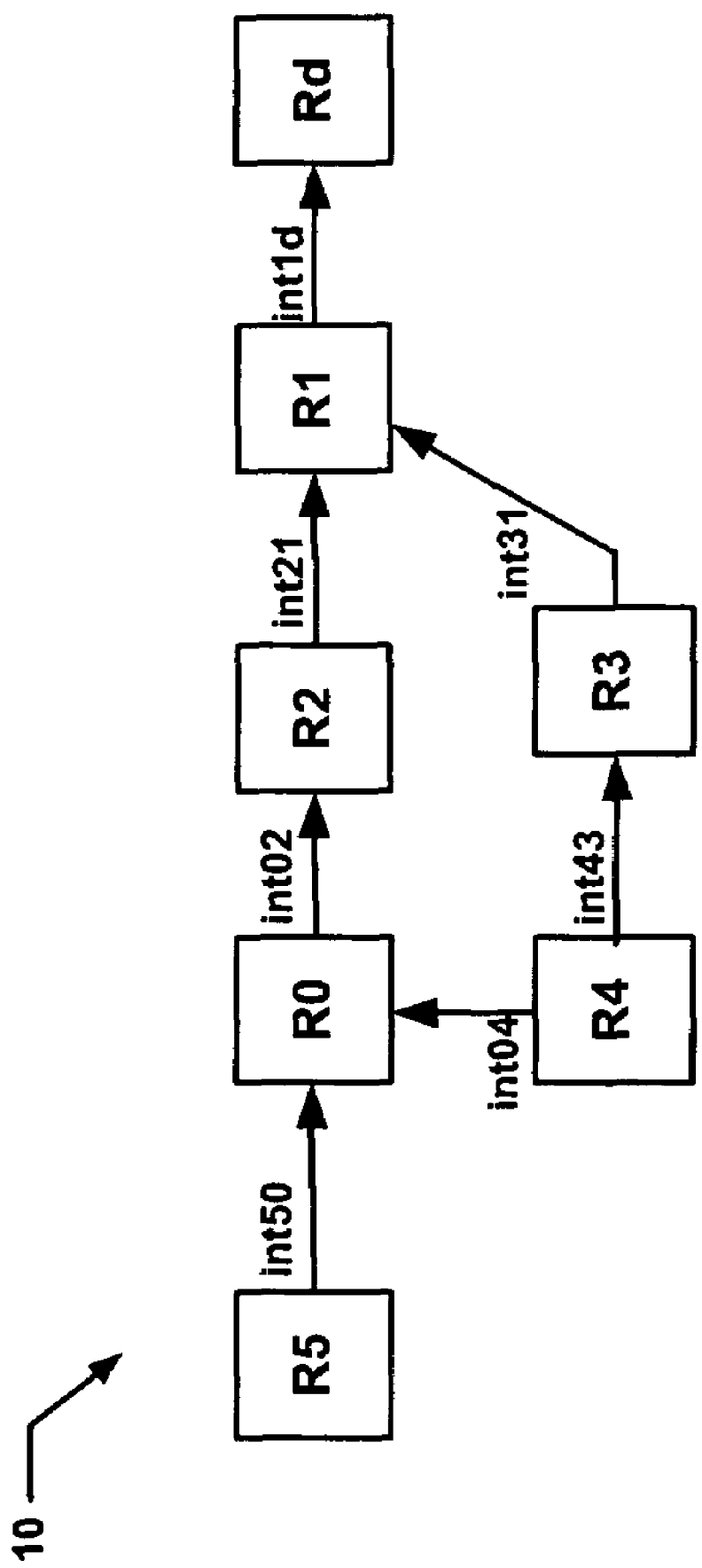
FIG. 1 illustrates a network environment showing routers and interfaces.

Referring now to FIG. 1, an example of a first network configuration 10 is shown. In FIG. 1, R0 is the router of primary interest. D is the prefix of interest. Rd is the destination router; i.e., D is attached to Rd. intNM is an interface/link name; i.e., link int21 connects R2 and R1. This is shown below in Table 1

TABLE 1

| Router | Next Hop (router, outgoing interface) |
|---|---|
| R0 | R2, int02 |
| R1 | Rd, int1d |
| R2 | R1, int21 |
| R3 | R1, int31 |
| R4 | R0, int04 |
| R5 | R0, int50 |

Lr_Ri denotes the (Lr) label assigned by router Ri for its normally routed path for prefix D and La_Ri denotes the (La) label assigned by router Ri for its alternate path to prefix D. The routers have followed the procedures described above for label assignment, advertisement, and programming for normal routed and alternate path LSPs.

Following LDP convergence the following table (Table 2) illustrates the LDP LIB (Label Information Base) entry for prefix D on each of R0, . . . , R5:

TABLE 2

| Router | Local Labels | Peer, Peer label, <Peer Path Vector> |
|---|---|---|
| R0: | Lr__R0, La__R0 | R2, Lr__R2, <Rd, R1, R2> |
|  |  | R4, La__R4, <Rd, R1, R3, R4> |
|  |  | R5, La__R5 < . . . loop . . . >* |
| R1: | Lr__R1, La__R1 | Rd, Lr__Rd, <Rd> |
|  |  | R2, La__R2, < . . . loop . . . >* |
|  |  | R3, La__R2 < . . . loop . . . >* |
| R2: | Lr__R2, La__R2 | R1, Lr__R1, <Rd, R1> |
|  |  | R0, La__R0, <Rd, R1, R3, R4, R0> |
| R3: | Lr__R3, La__R3 | R1, Lr__R1, <Rd, R1> |
|  |  | R4, La__R4, <Rd, R1, R2, R0, R4> |
| R4: | Lr__R4, La__R4 | R3, Lr__R3, <Rd, R1, R3> |
|  |  | R0, Lr__R0, <Rd, R1, R2, R0> |
| R5: | Lr__R5, La__R5 | R0, Lr__R0, <Rd, R1, R2, R0> |

*Normal path vector procedures detect loops in these paths and prohibit their use, as will be described in detail below.

Table 3 illustrates the MPLS forwarding table entries for D's normally routed and alternate path LSPs. A path vector received from an upstream router specifies the path traffic will take when the upstream router reroutes the traffic due to failure of the router receiving the path vector.

TABLE 3

| Router | In label → (Out label, Out interface); | Comment |
|---|---|---|
| R0 | Lr_R0 → (Lr_R2, int02); | normally routed LSP |
|  | La_R0 → (La_R4, int04); | alternate path LSP |
| R1 | Lr_R1 → (Lr_Rd, int1d); | normally routed LSP |
|  | --; | no alternate path |
| R2 | Lr_R2 → (Lr_R1, int21); | normally routed LSP |
|  | La_R2 → (La_R0, int02); | alternate path LSP |
| R3 | Lr_R3 → (Lr_R1, int31); | normally routed LSP |
|  | La_R3 → (Lr_R4, int43); | alternate path LSP |
| R4 | Lr_R4 → (Lr_R0, int04); | normally routed LSP |
|  | La_R4 → (Lr_R3, int43); | alternate path LSP |
| R5 | Lr_R5 → (Lr_R0, int50); | normally routed LSP |
|  | --; | no alternate path |

From R0 the normally routed LSP for D follows path R0→R2→R1→Rd and uses the following forwarding entries on R0, R2, and R1:

R0:Lr_R0→(Lr_R2, int02);
R2:Lr_R2→(Lr_R1, int21);
R1:Lr_R1→(Lr_Rd, int1d);

The alternate path LSP for D follows path R0→R4→R3→R1→Rd and uses the following forwarding entries on R0, R4, R3, and R1:

R0:La_R0→(La_R4, int04);
R4:La_R4→(Lr_R3, int43);
R3:Lr_R3→(Lr_R1, int31);
R1:Lr_R1→(Lr_Rd, int1d)

R0 can provide protection against the failure of link int02 or its normally routed next hop R2 by switching its forwarding entry:

from: Lr_R0→(Lr_R2, int02)
to: Lr_R0→(La_R4, int04)

when it detects a failure of the link or next hop.

Figure 2:
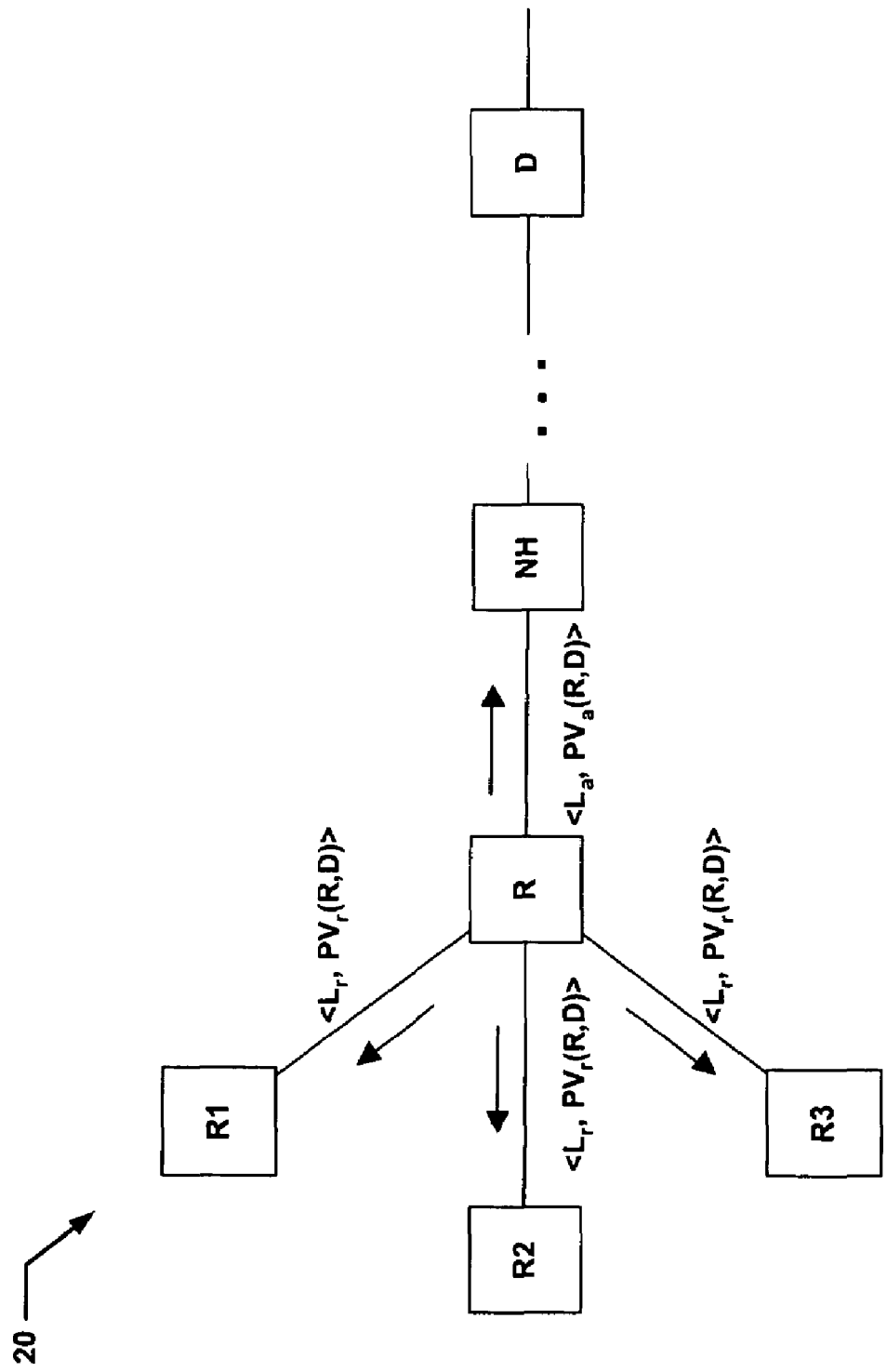
FIG. 2 illustrates a network environment showing the advertisement of local labels to upstream and downstream peers.

Referring now to FIG. 2, a network environment 20 is shown which depicts the labels and path vectors. Router R advertises a label and path vector ($L_r$, $PV_r(R,D)$) for routed path to upstream neighbors (R1, R2, R3), and will also advertise a label and path vector for alternate path ($L_a$, $PV_a(R,D)$) to downstream neighbors (NH). Router R learns a set of path vectors from its neighbors. Router R learns one from its next hop $PV_r(R,D)$. This is the PV for R's routed path to D. Router R also learns one path from each of its other neighbors: $PV_i(R,D)$. Each such PV represents a potential alternate path for R to D. Each of the $PV_i(R,D)$ intersects with $PV_r(R,D)$ either at D or at some point along the $PV_r(R,D)$ path to D. An alternate path is selected from the available alternate paths. Preferably this is accomplished by way of a selection rule as follows Let Candidate_Set=Set of $PV_i$'s whose merge point with $PV_r(R,D)$ is nearest (as measured in hops) to D. $PV_a(R,D)$ is the shortest PV (as measured in hops) in Candidate_Set.

Figure 3:
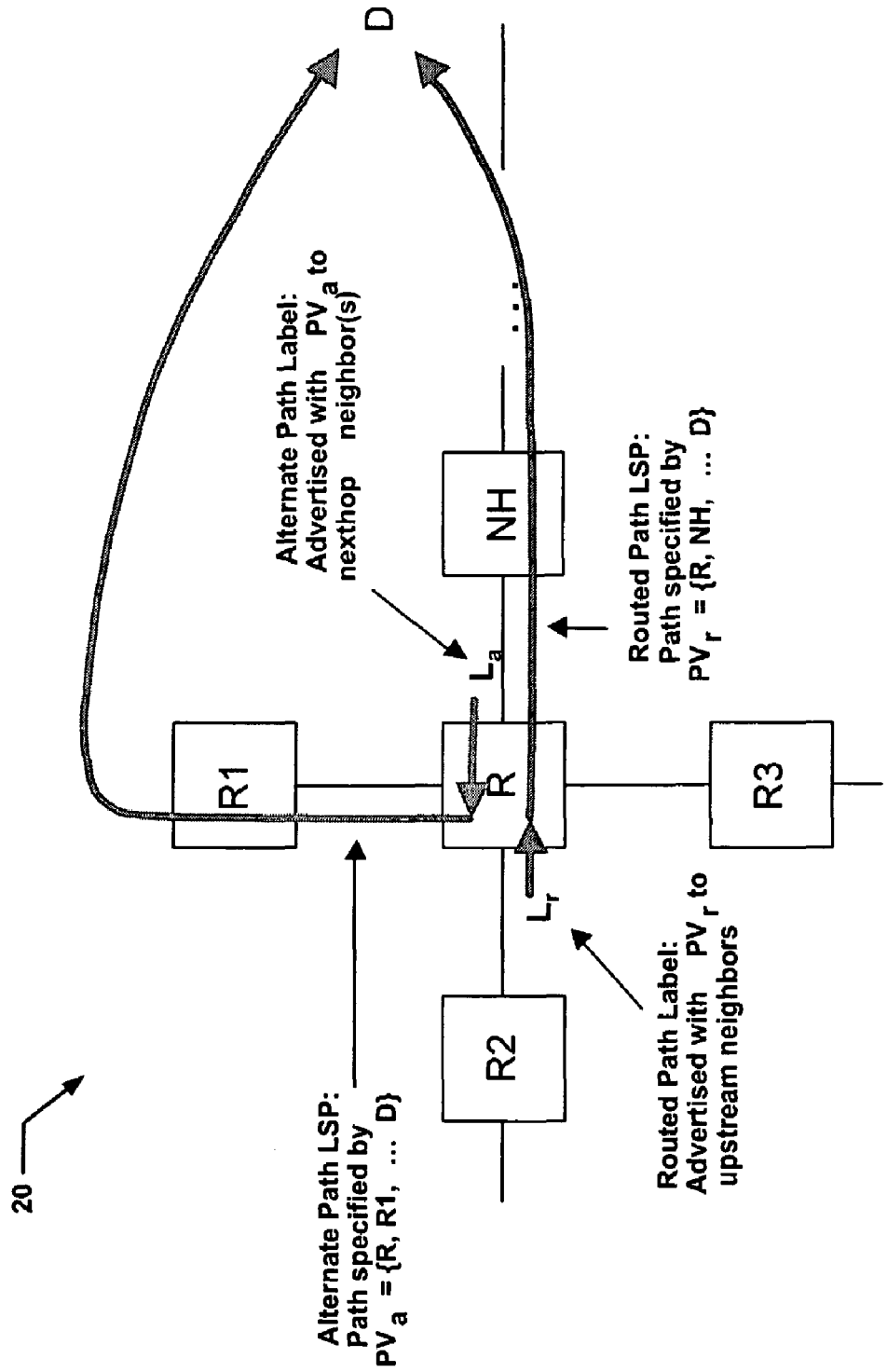
FIG. 3 shows the network environment of FIG. 2 wherein a routed path label is advertised to upstream neighbors and the alternate path label is advertised to nexthop neighbors.
Figure 4:
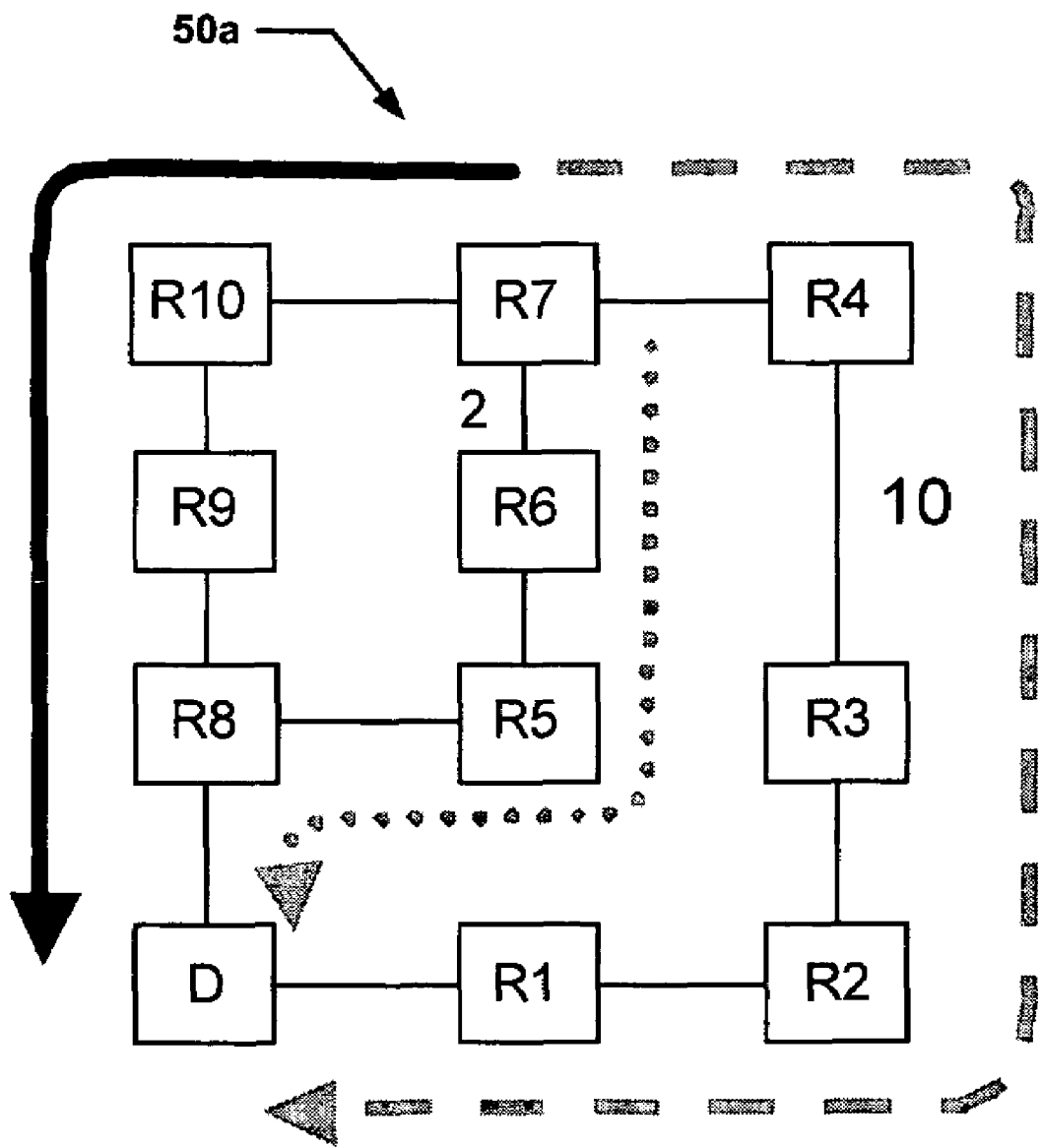
FIG. 4 illustrates a network environment having a routed path and multiple alternate paths.

As shown in FIG. 3, Router R advertises the routed path label PVr to upstream neighbors. This path is PVr={R, NH, . . . D}. Router R also advertises the alternate path label PVa to next hop neighbors. This path is PVa=(R, R1, . . . D} for R1. A router doesn't know whether the label and path vector it learns from a neighbor is a routed path or an alternate path. An example is shown in FIG. 4, wherein path vectors received by R7 include:

{R7, R10, R9, R8, D}Learned from R10(=$PV_1$)
{R7, R6, R5, R8, D}Learned from R6(=$PV_2$)
{R7, R4, R3, R2, R1, D}Learned from R4(=$PV_3$)

R10 is the routed next hop. Therefore, $PV_r(R7,D)=PV_1$. PV2 merges with $PV_r(R7,D)$ at R8, 1-hop from D; PV3 merges with $PV_r(R7,D)$ at D, 0-hop from D. Candidate_Set=$\{PV_3\}$, therefore $PV_a(R7,D)$ is $PV_3$.

Figure 5:
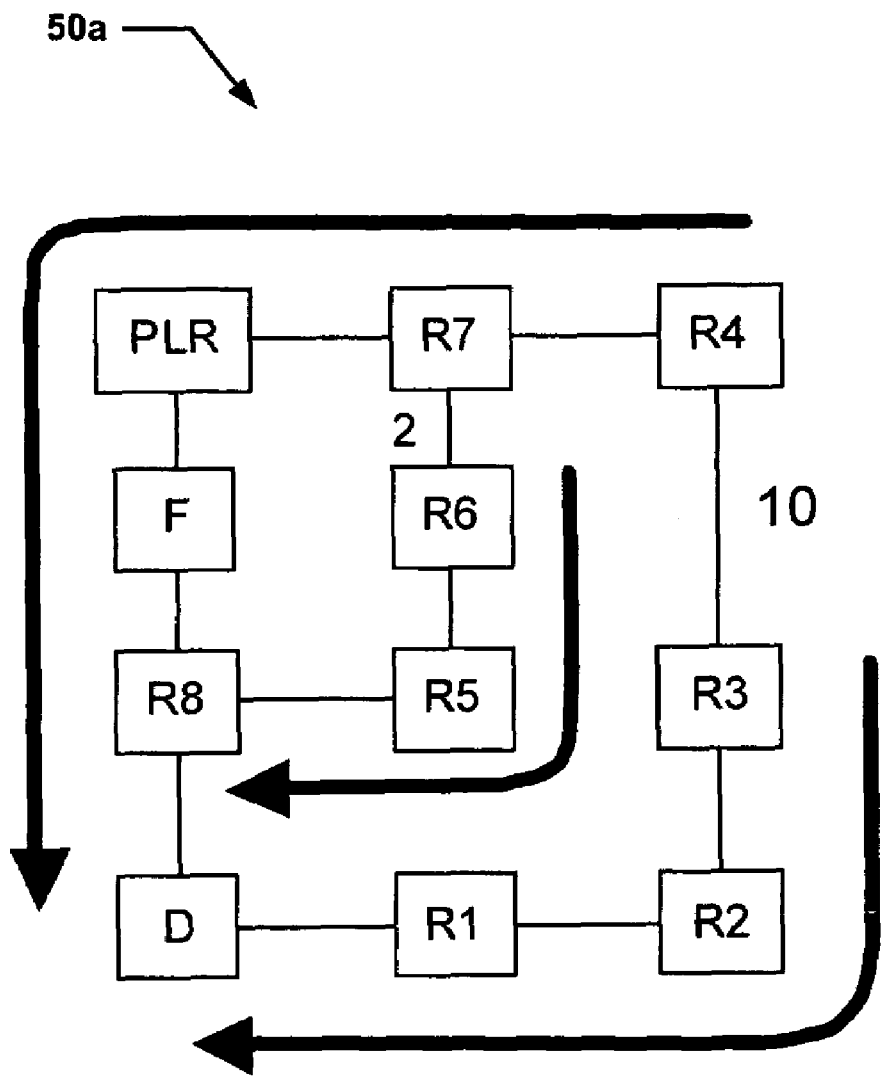
FIG. 5 shows a network environment and the routed paths for the environment.

An example of path vectors and routed paths is shown in FIG. 5. In this network environment 50a, the set of path vectors and routed paths are shown in Table 4

TABLE 4

| PV(R1): | {R1, D} | PVa(R1, D) |
|---|---|---|
|  | {R1, R2, R3, R4, R7, PLR, F, R8, D} |  |
| PV(R2): | {R2, R1, D} | PVa(R2, D) |
|  | {R2, R3, R4, R7, PLR, F, R8, D} |  |
| PV(R3): | {R3, R2, R1, D} | PVa(R3, D) |
|  | {R3, R4, R7, PLR, F, R8, D} |  |
| PV(R4): | {R4, R7, PLR, F, R8, D} | PVa(R4, D) |
|  | {R4, R3, R2, R1, D} |  |
| PV(R5): | {R5, R8, D} | PVa(R5, D) |
|  | {R5, R6} + PVa(R6, D) = |  |
|  | {R5, R6, R7, PLR, F, R8, D} |  |
| PV(R6): | {R6, R5, R8, D} | PVa(R6, D) |
|  | {R6, R7} + PVr(R7, D) = |  |
|  | {R6, R7, PLR, F, R8, D} |  |
| PV(R7): | {R7, PLR, F, R8, D} | PVa(R7, D) |
|  | {R7, R6, R5, R8, D} |  |
|  | {R7, R4, R3, R2, R1, D} |  |
| PV(R8): | {R8, D} | PVa(R8, D) |
|  | {R8, F} + PVa(F, D) = |  |
|  | {R8, F, PLR, R7, R4, R3, R2, R1, D} |  |
|  | {R8, R5} + PVa(R5, D) = |  |
|  | {R8, R5, R6, R7, R4, R3, R2, R1, D} |  |
| PV(PLR): | {PLR, F, R8, D} | PVa(PLR, D) |
|  | {PLR, R7} + PVa(R7, D) = |  |
|  | {PLR, R7, R4, R3, R2, R1, D} |  |
| PV(F): | {F, R8, D} | PVa(F, D) |
|  | {F, PLR} + PVa(PLR, D) = |  |
|  | {F, PLR, R7, R4, R3, R2, R1, D} |  |

Figure 6:
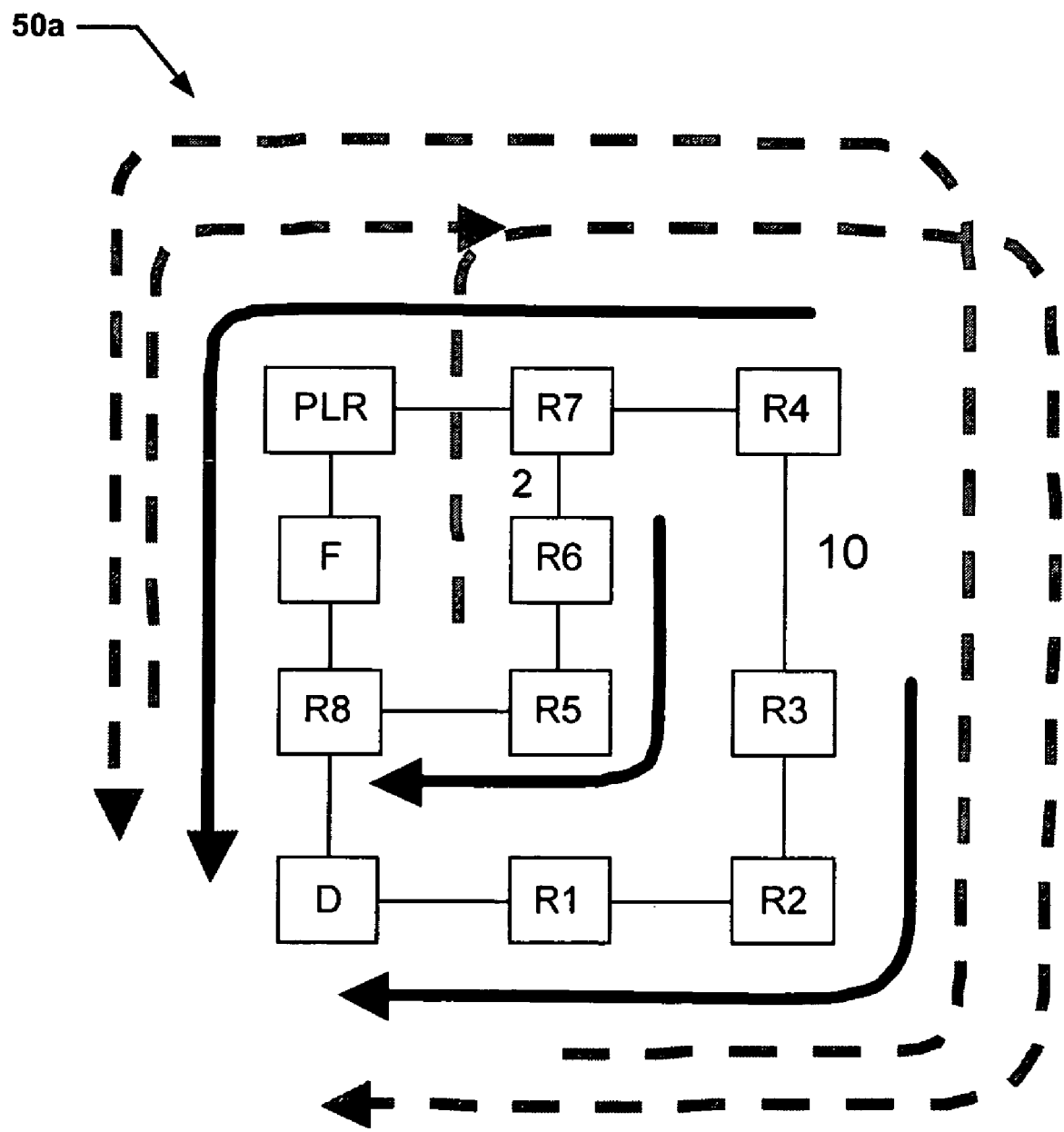
FIG. 6 shows the network environment of FIG. 5 and further includes alternate paths.

FIG. 6 shows the different routed paths (solid lines) and the different alternate paths (dashed lines) through the network environment 50a.

Figure 7:
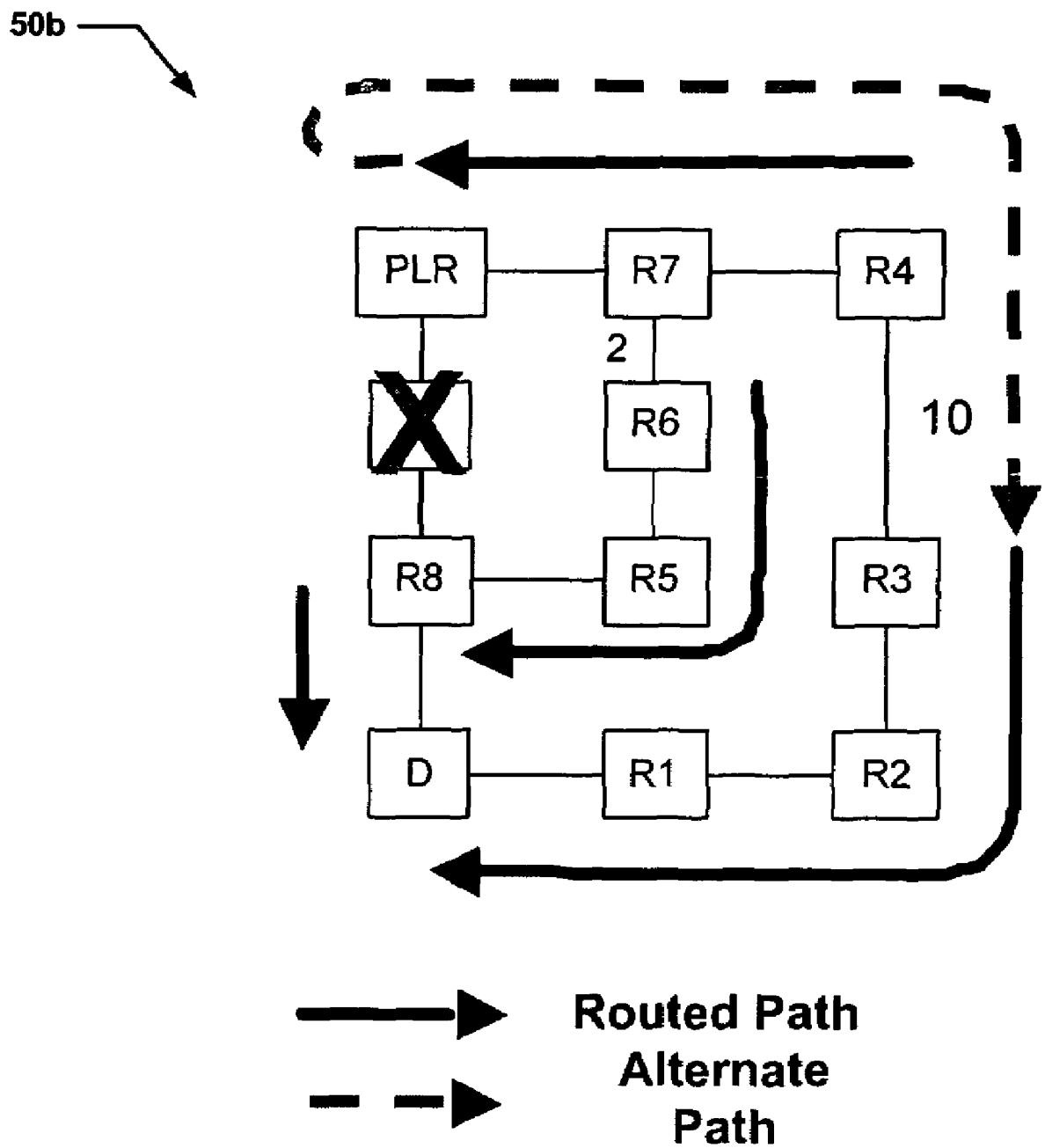
FIG. 7 shows the network environment of FIG. 5 wherein a first router has failed.

In FIG. 7, in network environment 50b, router F has failed. R1, R2 and R3 are not effected by the failure of Router F since router F is not in the normal path vector for these routers. Similarly, R5, R6 and R8 are also not effected. For R4, the routed path+U-Turn at PLR to join Alternate Path is used. This can be shown as follows:

{R4, R7, PLR, —U-Turn—R7, R4, R3, R2, R1, D}.

For R7, the routed path+U-Turn at PLR to join Alternate Path is used. This can be shown as:

{R7, PLR, —U-Turn—R7, R4, R3, R2, R1, D}

A similar scenario involves PLR wherein the alternate path is used. This is:

{PLR, R7, R4, R3, R2, R1, D}.

Figure 8:
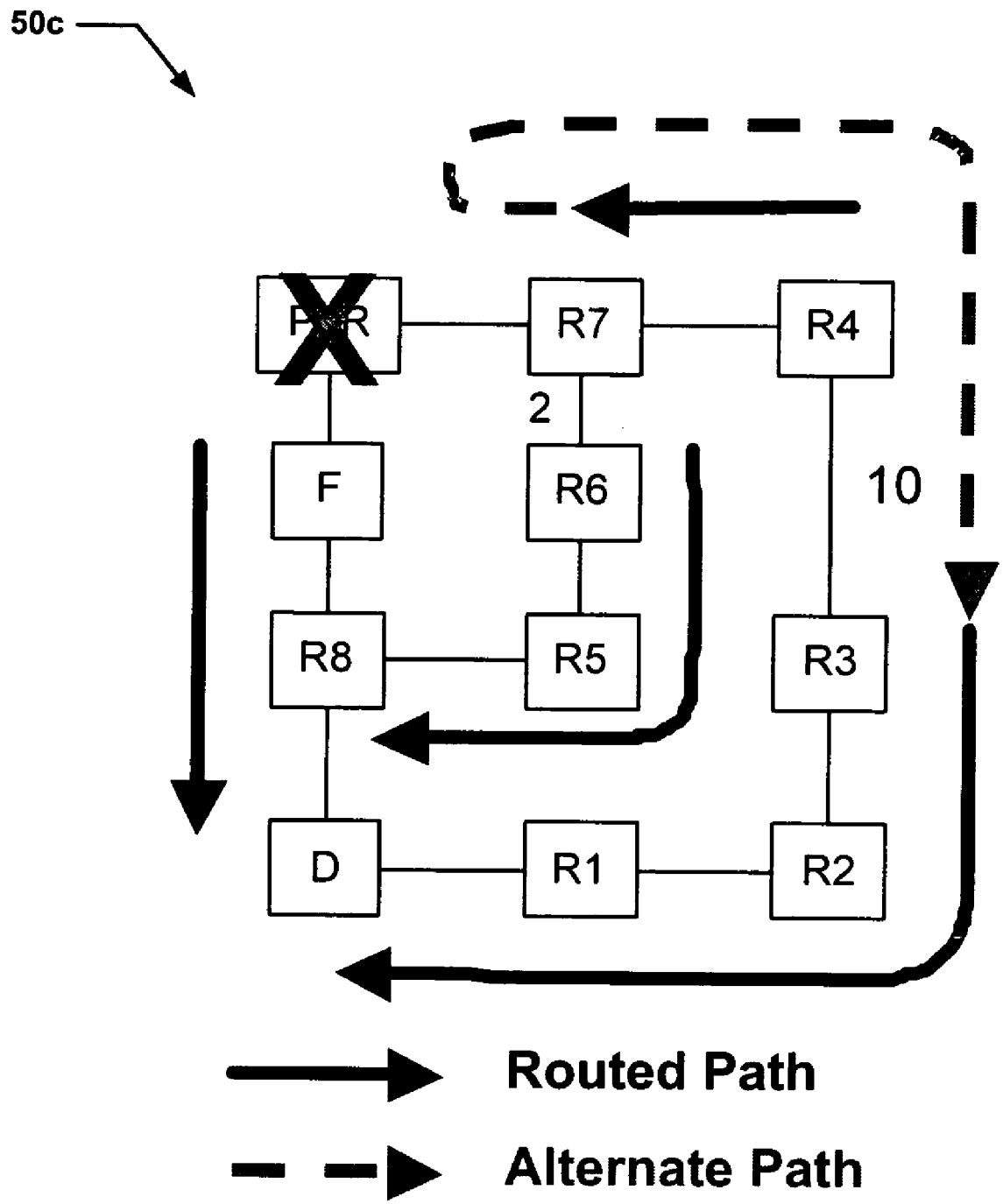
FIG. 8 shows the network environment of FIG. 5 wherein a second router has failed.

Different failures result in different alternate paths being used throughout the same environment. For example, in FIG. 8, network environment 50c has had router PLR fail. As a result, R1, R2, R3, R5, R6, R8 and F are not effected. For R4, the routed path+U-Turn at PLR to join alternate path is used. This is shown as:

{R4, R7, —U-Turn—,R4, R3, R2, R1, D}

For R7, the alternate path is used, shown as:

{R7, R4, R3, R23, R1,D}

Figure 9:
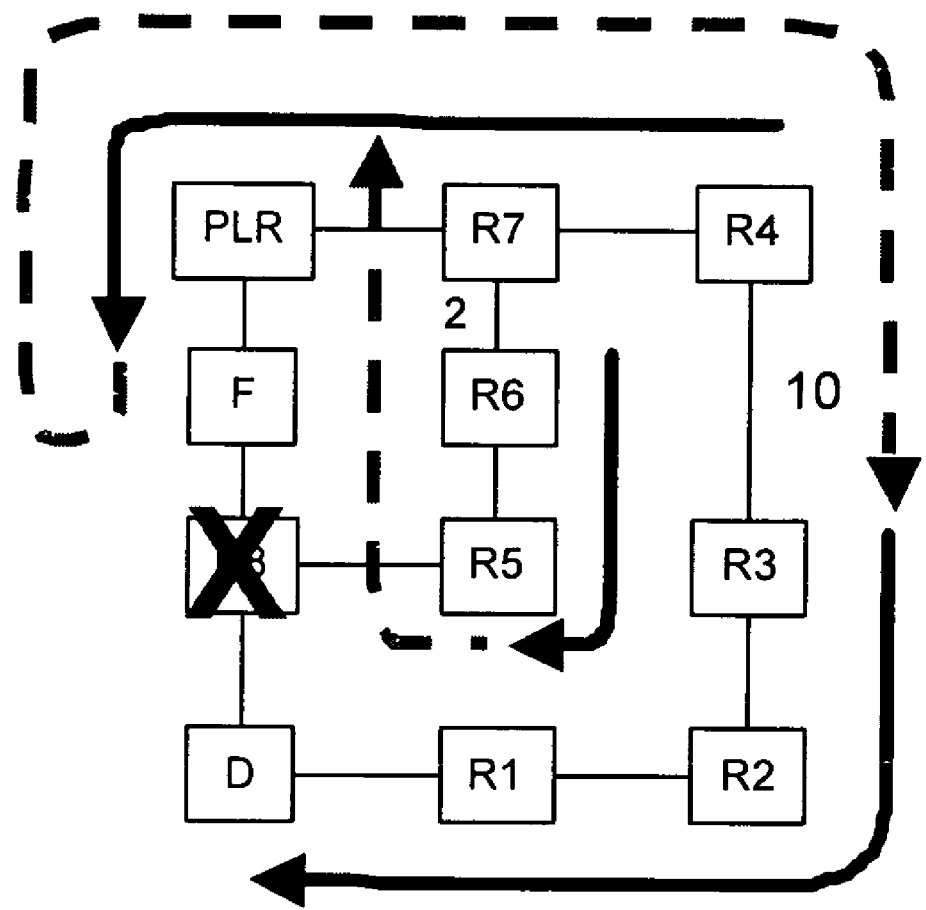
FIG. 9 shows the network environment of FIG. 5 wherein a third router has failed.

Referring now to FIG. 9, network environment 50d has had router R8 fail. As a result, R1, R2 and R3 are not effected. For R4, the routed path+U-Turn at F to join Alternate Path is used, shown as:

{R4, R7, PLR, F, —U-Turn—PLR, R7, R4, R3, R2, R1, D}

For R5, the alternate path to routed path at R7+U-Turn at F to Alternate Path is used. This is shown as: {R5, R6, R7, PLR, F,—U-Turn—, PLR, R7, R4, R3, R2, R1, D} For R6, the routed path+U-turn at F to join alternate path to routed path at R7+U-turn at F to alternate path is used. This is shown as:

{R6, R5, —U-Turn—,R6, R7, PLR, F, —U-Turn, PLR, R7, R4, R3, R2, R1, D}.

For R7, the routed path_U-turn at F to join alternate path is used, shown as:

{R7, PLR, F, —U-Turn—,PLR, R7, R4, R3, R2, R1, D}.

For PLR, routed path+U-Turn at F to join alternate path is used. This is shown as:

{PLR, F, —U-Turn—,PLR, R7, R4, R3, R2, R1, D}

For F, the alternate path is used, shown as:

{F, PLR, R7, R4, R3, R2, R1, D}.

Figure 10:
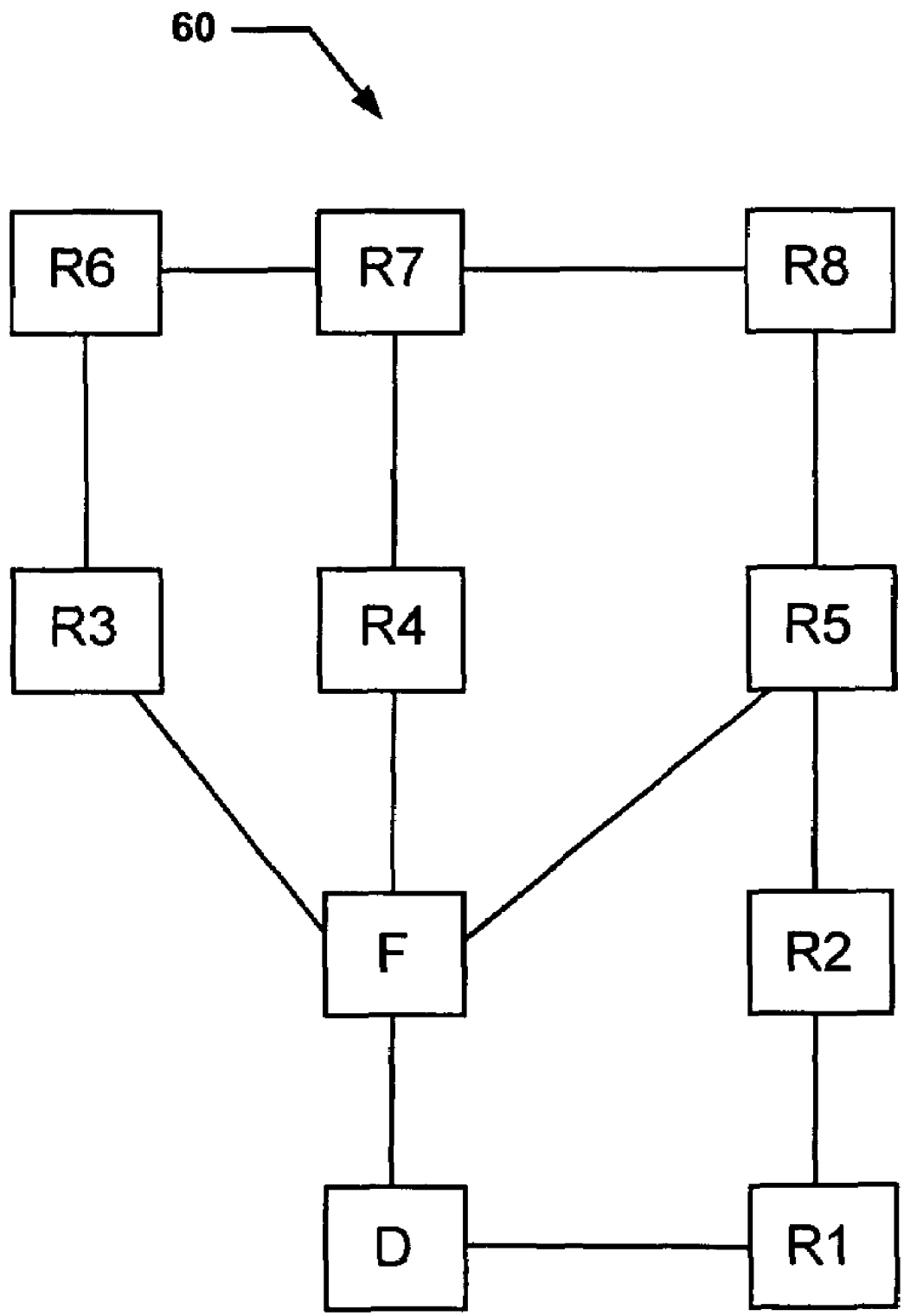
FIG. 10 illustrates a network environment having a routed path and multiple alternate paths including masked path vectors in a correctable FRR-loop.

Referring now to FIG. 10, a network environment 60 is shown wherein masked path vectors are present. In this example R5 advertises its routed path {R5, F, D} to R8. R8, R7, R6, R3, and R4 see paths which include { . . . , R5, F, D}, however, they do not see paths which include { . . . , R5, R2, R1, D}. The vector containing { . . . , R5, R2, R1, D} is referred to as a masked path vector. Masked path vectors may result in looping alternate paths. R3, R4, R6, and R7 will program alternate paths:

R7:{R6, R3, F, D}
R6:{R7, R4, F, D}
R3:{R6, R7, R4, F, D}.
R4:{R7, R6, R3, F, D}.

Figure 11:
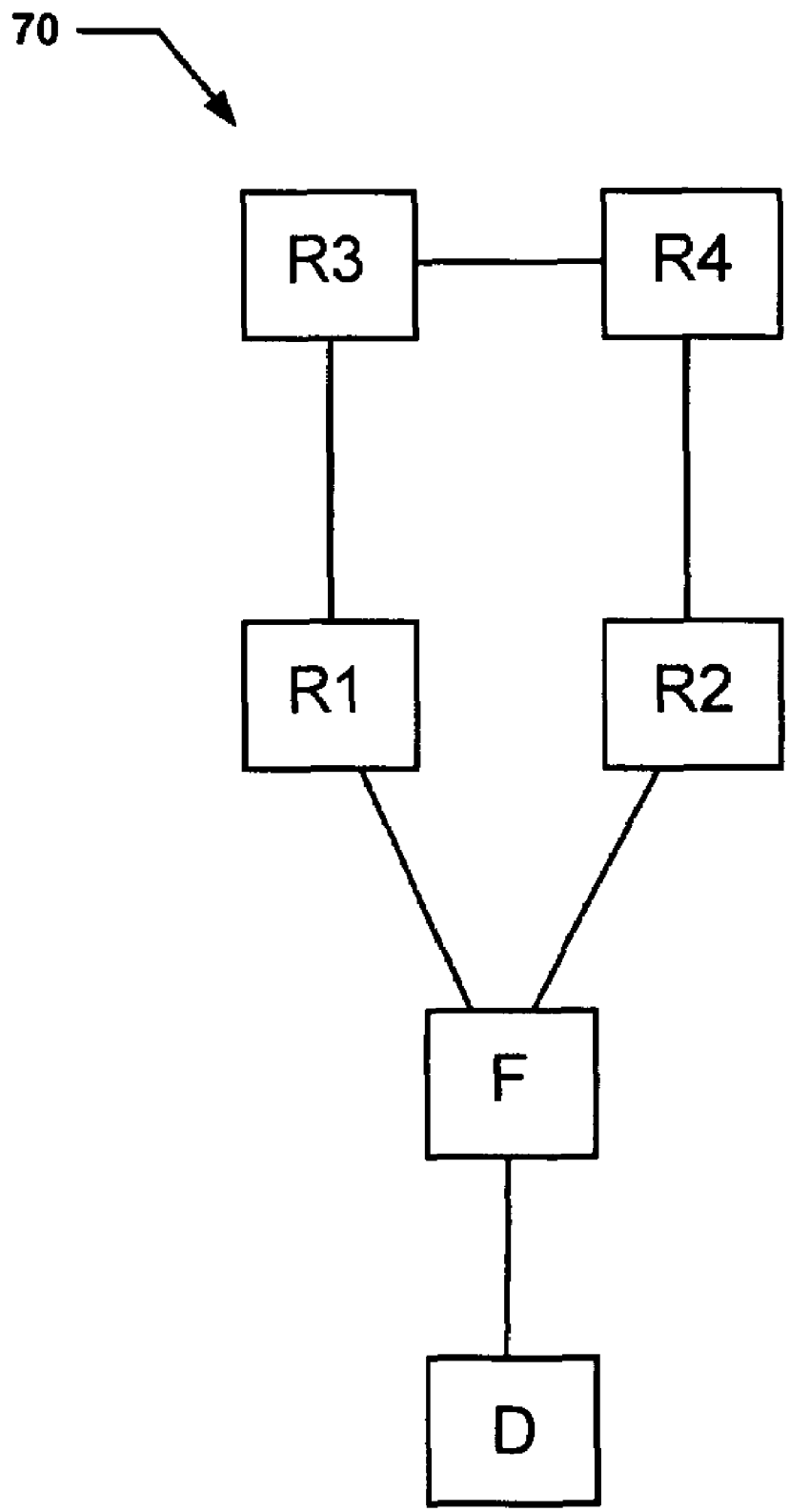
FIG. 11 illustrates a network environment having a routed path and multiple alternate paths including a single path loop in a non-correctable FRR loop.

When F fails traffic for D from R3, R4, R5, R6 will take an alternate path that loops:

. . . R3→R6→R7→R4→R7→R6→R3 . . .

unless corrective action is taken. Preferably, the corrective action would break the loop by changing backup path at R7 to use R8. In certain situation, there may be no non-looping alternate path. Referring now to FIG. 11, R1 advertises its routed path {R1, F, D} to R3, and R2 advertises its routed path {R2, F, D} to R4. R1 and R3 see alternate paths that include:

{ . . . , R4, R2, F, D}

R2 and R4 see alternate paths that include:

{ . . . , R3, R1, F, D}

R1, R2, R3, and R4 will program alternate paths:

R1:{R3, R4, R2, F, D}
R2:{R4, R3, R1, F, D}
R3:{R4, R2, F, D}.
R4:{R3, R1, F, D}.

When F fails traffic for D from R1, R2, R3, R4 will take an alternate path that loops

. . . R1→R3→R4→R2→R4→R3→R1 . . .

unless corrective action is taken.

The backup paths computed to provide protection against the failure of a node may force traffic to loop when the protected node fails. For example, consider R2 and R3 in network environment 70 of FIG. 11. They appear to have node protection for their routed next hop (R1). However, if R1 fails R3 will reroute traffic for D along path R4, R0, R2, R1, Rd, and when the traffic arrives at R2 it will reroute it along path R0, R4, R3, R1, Rd. The result is that the rerouted traffic will loop. In order to be a viable basis for FRR protection the path vector determination should provide means to detect looping FRR paths such as that between R2 and R3 as described above.

The following loop detection procedure may be applied by a router (F) to detect whether traffic redirected by its upstream neighbors to their alternate paths when it (F) fails will loop. First F checks whether it appears in the path vectors received from upstream routers. If F appears in no more than 1 of those path vectors there can be no loop. If F appears in more than one path vector then F creates a new set of truncated vectors {V1, V2, . . . , Vn} from the subset of path vectors that it appears in by removing itself and the routers that follow from each; for example:

path vector:Pa=R1, R2, . . . , Ri, F, Rj , . . . Rn
truncated vector:Va=R1, R2, . . . , Ri.

F then uses the set of truncated vectors and a marking scheme to trace the path traffic follows when F fails. There are three marks: Looping, LoopFree, and Visited. F considers each of the Vi as follows.

a. If Vi is marked as Looping consideration of Vi is complete.
b. Mark Vi as Visited and clear the Visited marks from all the other Vj.
c. Set C=Vi
d. Let L=the last element of C.
e. Locate the Vk whose first element is L. If there is no such Vk or if Vk is marked as LoopFree mark Vi as LoopFree. Consideration of Vi is complete.
f. If Vk is marked as Visited or as Looping, then the set of V's marked as Visited plus Vk represents an FRR loop. Mark Vi as Looping and mark Vk as Looping if it is not already so marked. Consideration of Vi is complete.
g. If Vk is not marked as Visited, mark it Visited, set C to Vk and repeat steps go to step(d).

After consideration of all Vi each path learned from an upstream neighbor is marked as either Looping or LoopFree. FRR loop detection for failure of F is complete.

Figure 12:
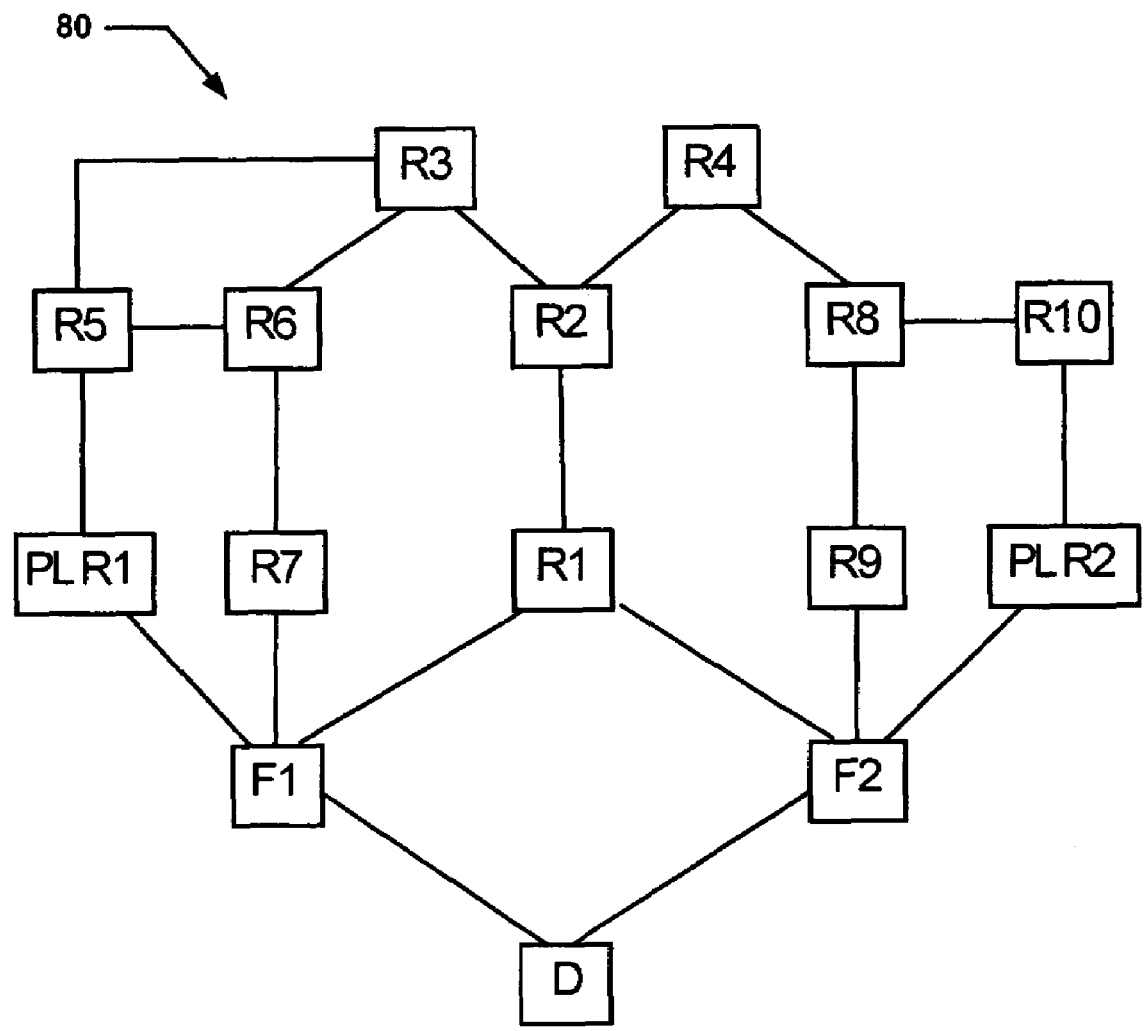
FIG. 12 illustrates a network environment having a routed path and multiple alternate paths including multipath loops in a correctable FRR loop.

Referring now to FIG. 12, the detection of FRR loops is described. In the network environment 80, each potential point of failure (e.g. router) examines path vectors received from upstream neighbors for loops, assuming that it has failed. The table of path vectors is shown below as Table 6 for network environment 80 of FIG. 12.

TABLE 6

| F1 | {D} | |
| | {PLR1, R5, R6, R7, F1, D} | |
| | {R7, R6, R5, PLR1, F1, D} | |
| | {R1, R2, R4, R8, R9, F2, D} | |
| F2 | {D} | |
| | {PLR2, R10, R8, R4, R2, R1, F1, D} | |
| | {R9, R8, R4, R2, R1, F1, D} | |
| | {R1, R2, R4, R8, R9, F2, D} | |
| PLR1 | {F1, D} | |
| | {R5, R6, R7, F1, D} | |
| R7 | {F1, D} | |
| | {R6, R5, PLR1, F1, D} | |
| R1 | {F1, D} | |
| | {F2, D} | |
| | {R2, R4, R8, R9, F2, D} | |
| R9 | {F2, D} | |
| | {R8, R4, R2, R1, F1, D} | |
| PLR2 | {F2, D} | |
| | {R10, R8, R4, R2, R1, F1, D} | |
| R5 | {PLR1, F1, D} | |
| | {R3, R6, R7, F1, D} | |
| | {R6, R7, F1, D} | |
| R6 | {R7, F1, D} | |
| | {R3, R5, PLR1, F1, D} | |
| | {R5, PLR1, F1, D} | |
| R2 | {R1, F1, D} | Assumes R1 advertises |
| | {R4, R8, R9, F2, D} | {F1, D} |

TABLE 6-continued

| | {R3, R5, PLR1, F1, D} | Assumes R3 advertises Alt Path1 |
| R8 | {R9, F2, D} | |
| | {R4, R2, R1, F1, D} | |
| | {R10, PLR2, F2, D} | |
| R10 | {PLR2, F2, D} | |
| | {R8, R9, F2, D}} | |
| R3 | {R5, PLR1, F1, D} | Assumes selected by R3 as Alt Path1 |
| | {R6, R7, F1, D} | Assumes selected by R3 as Alt Path2 |
| | {R2, R1, F1, D} | Assumes R1 advertises {F1, D} |
| R4 | {R2, R1, F1, D} | Assumes R1 advertises {F1, D} |
| | {R8, R9, F2, D} | |

Referring now to Table 6, loop detection for various alternate paths can be performed. For example, to perform loop detection in the event the path between F1 and D fails, the first alternate path comprising PLR1, R5, R6, R7, F1 and D is looked at. This path includes the failing device (F1) so the method is performed wherein the last node before the failure (R7) is chosen to see if this device is at the front of another alternate path. The second alternate path begins with R7, so this alternate path is used. This path continues now with R7, then to R6, R5, PLR1 and stops here since F1 is the source of the failure. The first alternate path begins with PLR1, so the path is continued here, but this results in a loping alternate path, therefore this alternate path should not be used. In the F1 example, the only alternate path to use is the third one since the first one and second one loop within each other.

A similar situation occurs in the event the path between F2 and D fails. There are three alternate paths. The first alternate path begins at PLR2, R10, R8, R4, R2, R1, F1 to D and is usable as an alternate path. The second one begins with R9, R8, R4, R2, R1, F1 to D and is also usable. The third one begins with R1, R2, R4, R8, R9 then encounters the failed device F2, so this path continues with the alternate path that begins with R9, the second alternate path. The second alternate path has already been qualified as a good a alternate path, therefore the third path which loops to the second path is also a viable alternate path.

Figure 13:
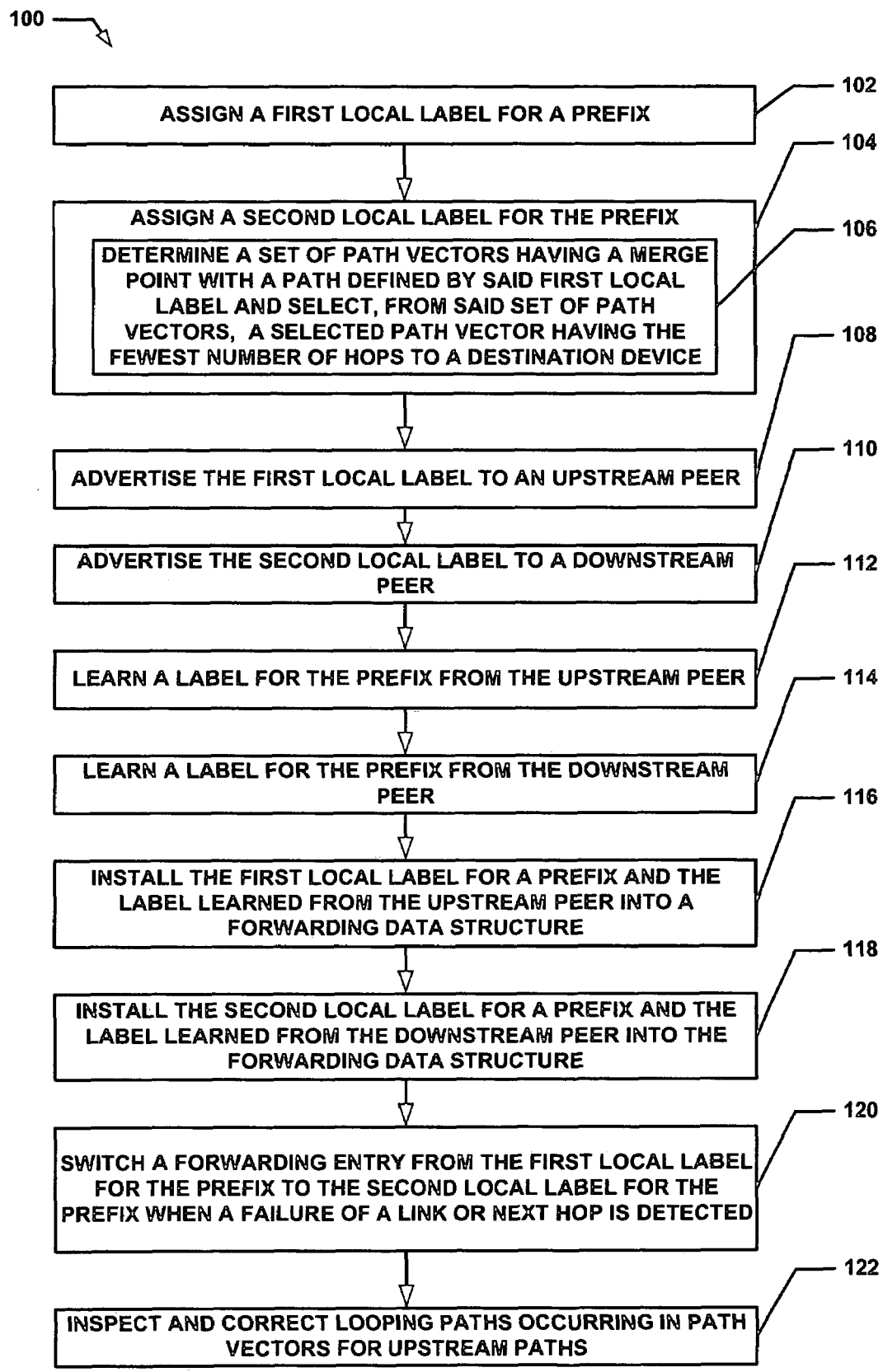
FIG. 13 illustrates a flow chart of a particular embodiment for performing fast rerouting in a network in accordance with embodiments of the invention.
Figure 14:
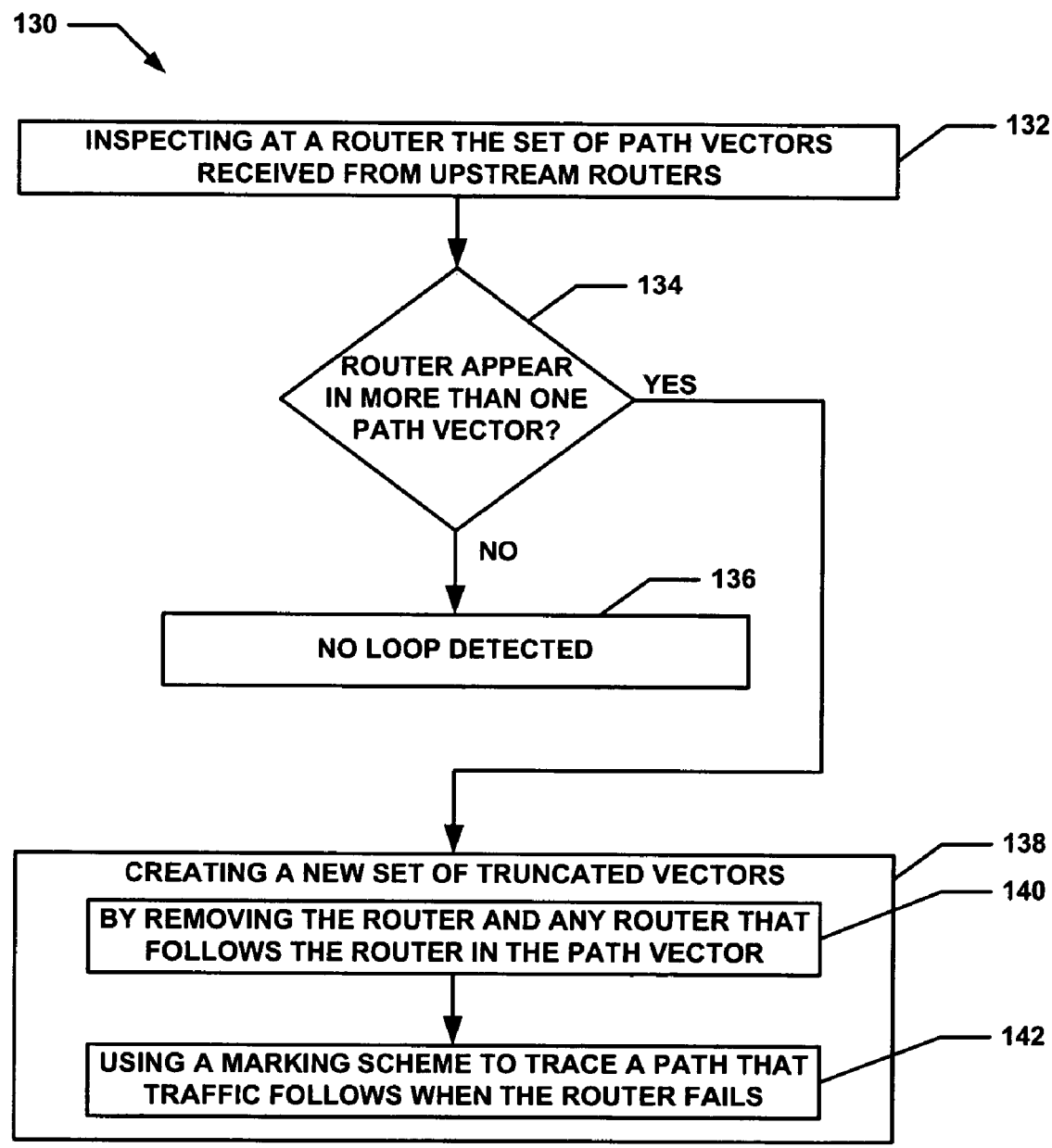
FIG. 14 illustrates a flow chart of a particular embodiment for inspecting and detecting looping paths in accordance with embodiments of the invention.
Figure 15:
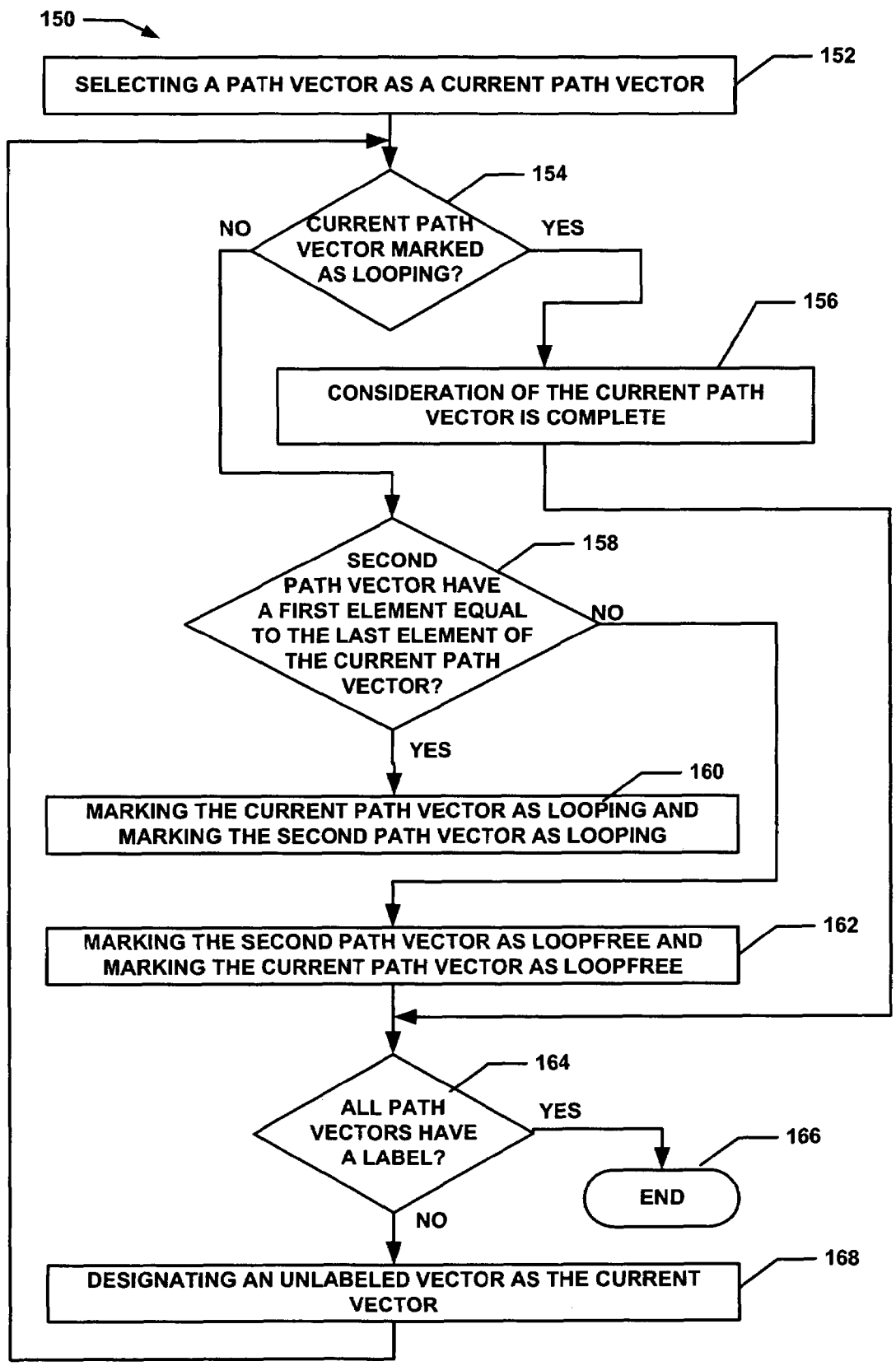
FIG. 15 illustrates a flow chart of a particular embodiment for utilizing a marking scheme to trace paths for detecting multipath loops in accordance with embodiments of the invention.

A flow chart of the presently disclosed method is depicted in FIGS. 13, 14 and 15. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 13, a particular embodiment of a method 100 of using LDP to establish label switched paths for directed forwarding in a network is shown. The method begins with processing block 102 wherein a first local label for a prefix is assigned.

In processing block 104 a second local label for said prefix is assigned. As shown in processing block 106 the assigning of a second local label for the prefix includes first determining a set of path vectors having a merge point with a path defined by the first local label and then selecting, from the set of path vectors, a selected path vector having the fewest number of hops to a destination device.

Processing block 108 recites advertising the first local label to an upstream peer. Processing block 110 discloses advertising the second local label to a downstream peer. In this manner both labels are advertised through the network.

In processing block 112, a label is learned for the prefix from the upstream peer. In processing block 114 a label is learned for the prefix from the downstream peer.

In processing block 116 the first local label for a prefix and the label learned from the upstream peer are installed into a forwarding data structure. In processing block 118 the second local label for a prefix and the label learned from the downstream peer are also installed into the forwarding data structure.

In processing block 120 a forwarding entry from the first local label for the prefix is switched to the second local label for the prefix when a failure of a link or next hop is detected. This permits the fast rerouting of traffic in the event of a device or link failure.

In processing block 122 the path vectors for upstream paths are inspected and any looping paths are corrected.

Referring now to FIG. 14, a particular embodiment of a method 130 for correcting and inspecting looping paths is shown. The method 130 begins with processing block 132 wherein the set of path vectors received from upstream routers are inspected at a router.

In decision block 134, a determination is made regarding whether the router appears in more than one path vector. When the router does not appear in more than one path, then there is no loop and processing proceeds to processing block 136 where the process is terminated.

When the determination made at decision block 134 is that the router does appear in more than one path, then processing continues with processing block 138 et seq.

In processing block 138, when the router appears in more than one path vector then a new set of truncated vectors is created. The new set of truncated vectors is created, as recited in processing block 140, by removing the router and any router that follows the router in the path vector. Further, as recited in processing block 142 a marking scheme is used to trace a path that traffic follows when the router fails.

Referring now to FIG. 15, a particular embodiment of a method 150 of using a marking scheme is shown. This method 150 begins with processing block 152 wherein a path vector is selected as a current path vector.

At decision block 154 a determination is made regarding whether the current path vector is marked as looping. When the current path vector is marked as looping then processing continues at processing block 156, otherwise processing continues at decision block 158

At processing block 156, when the determination is that the current path vector is marked as looping, consideration of the current path vector is complete and processing continues at decision block 164.

At decision block 158, when the current path vector is not marked as looping then a determination is made regarding whether a second path vector has a first element equal to the last element of the current path vector. When the second path vector has a first element equal to the last element of the current path vector, processing continues at processing block 160, otherwise processing continues at processing block 162.

At processing block 160 when the second path vector has a first element equal to the last element of the current path vector, then the current path vector is marked as looping and the second path vector is marked as looping.

At processing block 162 when the second path vector does not have a first element equal to the last element of the current path vector, then the second path vector is marked as loopfree and the current path vector is also marked as loopfree.

At decision block 164 a determination is made whether all path vectors have a label. When al the path vectors have a label, then the marking processing ends as shown in processing block 166. Otherwise processing continues at processing block 168.

In processing block 168, when all path vectors do not have a label then an unlabeled vector is designated as the current vector and processing continues at decision block 154 et seq.

Figure 16:
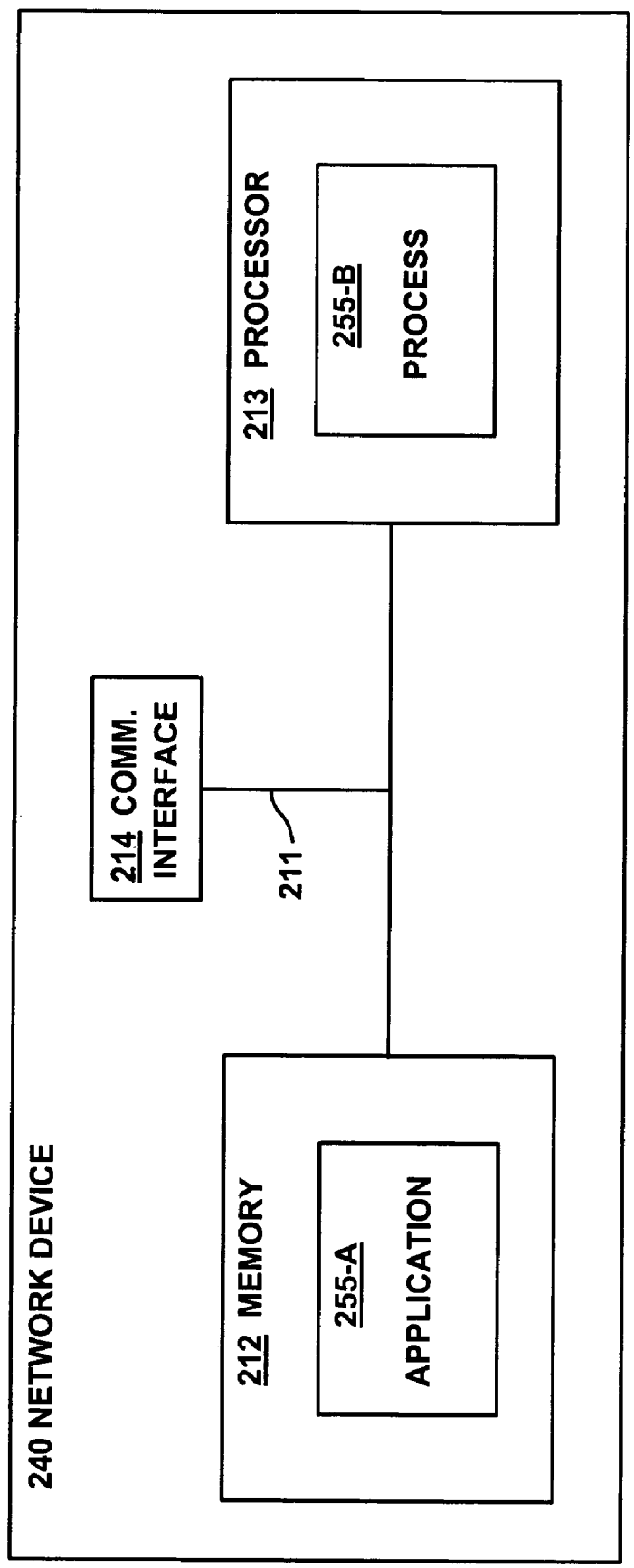
FIG. 16 illustrates an example device architecture that provides fast rerouting in a network in accordance with embodiments of the invention.

FIG. 16 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method, performed in a label switch router, of providing fast rerouting in a network comprising:
   assigning a first local label for an address prefix;
   assigning a second local label for said address prefix;
   advertising said first local label to an upstream peer; and
   advertising said second local label to a downstream peer;
   wherein the first local label and the second local label are distinct;
   wherein the first local label designates a normal path towards a destination router indicated by said address prefix, while the second local label indicates an alternate path towards the destination router indicated by said address prefix;
   wherein advertising said first local label to an upstream peer includes sending a message across a first network interface of said label switch router towards an upstream peer label switch router; and
   wherein advertising said second local label to a downstream peer includes sending a message across a second network interface of said label switch router towards a downstream peer label switch router.

2. The method of claim 1 further comprising learning a label for said address prefix from said upstream peer.

3. The method of claim 2 further comprising learning a label for said address prefix from said downstream peer.

4. The method of claim 3 further comprising installing said first local label for said address prefix and said label learned from said upstream peer into a forwarding data structure.

5. The method of claim 4 further comprising installing said second local label for said address prefix and said label learned from said downstream peer into said forwarding data structure.

6. The method of claim 5 further comprising switching a forwarding entry from said first local label for said address prefix to said second local label for said address prefix when a failure of a link or next hop is detected.

7. The method of claim 1 wherein said assigning a second local label for said address prefix comprises:
   determining a set of path vectors having a merge point closest, measured in hops, to a destination router with a path defined by said first local label; and
   selecting, from said set of path vectors, a selected path vector having the fewest number of hops to a destination device.

8. The method of claim 5 further comprising inspecting and correcting looping paths occurring in path vectors for upstream paths.

9. A method of providing fast rerouting in a label switch router in a network comprising:
   assigning a first local label for an address prefix;
   assigning a second local label for said address prefix;
   advertising said first local label to an upstream peer;
   advertising said second local label to a downstream peer;
   learning a label for said address prefix from said upstream peer;
   learning a label for said address prefix from said downstream peer;
   installing said first local label for an address prefix and said label learned from said upstream peer into a forwarding data structure;
   installing said second local label for an address prefix and said label learned from said downstream peer into said forwarding data structure; and
   inspecting and correcting looping paths occurring in path vectors for upstream paths;
   wherein said correcting and inspecting looping paths comprises:
      inspecting, at said label switch router, the set of path vectors received from upstream routers;
      determining if said label switch router appears in more than one path vector;
      when said label switch router does not appear in more than one path vector then determining there is no loop; and
      when said label switch router appears in more than one path vector then creating a set of truncated vectors, said creating a set of vectors comprising:
         removing the router and any router that follows said label switch router in the path vector; and
         using a marking scheme to trace a path that traffic follows when said label switch router fails.

10. The method of claim 9 wherein said using a marking scheme comprises:
   selecting a path vector as a current path vector;
   determining if the current path vector is marked as looping and when said current path vector is marked as looping then consideration of the current path vector is complete;
   when said current path vector is not marked as looping then determining if a second path vector has a first element equal to the last element of the current path vector;
   when said second path vector has a first element equal to the last element of the current path vector, then marking the current path vector as looping and marking the second path vector as looping;
   when said second path vector does not have a first element equal to the last element of the current path vector, then marking the second path vector as loopfree and marking the current path vector as loopfree;
   determining if all path vectors have a label;
   when all path vectors have a label then terminating the marking process; and
   when all path vectors do not have a label then designating an unlabeled vector as the current vector and repeating said steps of determining if the current path vector is marked as looping, determining if a second path vector has a first element equal to the last element of the current path vector, and said determining if all path vectors have a label.

11. A computer system for label switch routing comprising:
   a memory;
   a processor;
   a communications interface;

an interconnection mechanism coupling the memory, the processor and the communications interface; and wherein the memory is encoded with an application that when performed on the processor, provides a fast rerouting process for processing information, the process causing the computer system to perform the operations of:

assigning a first local label for an address prefix;
assigning a second local label for said address prefix;
advertising said first local label to an upstream peer; and
advertising said second local label to a downstream peer;

wherein the first local label and the second local label are distinct; and wherein the first local label designates a normal path towards a destination router indicated by said address prefix, while the second local label indicates an alternate path towards the destination router indicated by said address prefix.

12. The computer system of claim 11 wherein said system further performs the operation of learning a label for said address prefix from said upstream peer.

13. The computer system of claim 12 wherein said system further performs the operation of learning a label for said address prefix from said downstream peer.

14. The computer system of claim 13 wherein said system further performs the operation of installing said first local label for said address prefix and said label learned from said upstream peer into a forwarding data structure.

15. The computer system of claim 14 wherein said system further performs the operation of installing said second local label for said address prefix and said label learned from said downstream peer into said forwarding data structure.

16. The computer system of claim 15 wherein said system further performs the operation of switching a forwarding entry from said first local label for said address prefix to said second local label for said address prefix when a failure of a link or next hop is detected.

17. The computer system of claim 11 wherein said assigning a second local label for said address prefix comprises:

determining a set of path vectors having a merge point closest, measured in hops, to a destination router with a path defined by said first local label; and selecting, from said set of path vectors, a selected path vector having the fewest number of hops to a destination device.

18. The computer system of claim 15 wherein said system further performs the operation of inspecting and correcting looping paths occurring in path vectors for upstream paths.

19. A computer system for label switch routing comprising:

a memory;
a processor;
a communications interface; and
an interconnection mechanism coupling the memory, the processor and the communications interface;

wherein the memory is encoded with an application that when performed on the processor, provides a fast rerouting process for processing information, the process causing the computer system to perform the operations of:

assigning a first local label for an address prefix;
assigning a second local label for said address prefix;
advertising said first local label to an upstream peer; and
advertising said second local label to a downstream peer;

wherein said system further performs the operation of learning a label for said address prefix from said upstream peer;

wherein said system further performs the operation of learning a label for said address prefix from said downstream peer;

wherein said system further performs the operation of installing said first local label for an address prefix and said label learned from said upstream peer into a forwarding data structure;

wherein said system further performs the operation of installing said second local label for an address prefix and said label learned from said downstream peer into said forwarding data structure;

wherein said system further performs the operation of inspecting and correcting looping paths occurring in path vectors for upstream paths; and wherein said correcting and inspecting looping paths comprises said system performing the operation of:

inspecting, at a router, the set of path vectors received from upstream routers;

determining if the router appears in more than one path vector;

when said router does not appear in more than one path vector then determining there is no loop; and when said router appears in more than one path vector then creating a set of truncated vectors, said creating a set of vectors comprising:

removing the router and any router that follows said router in the path vector; and using a marking scheme to trace a path that traffic follows when said router fails.

20. The computer system of claim 19 wherein said using a marking scheme comprises said system performing the operations of:

selecting a path vector as a current path vector;

determining if the current path vector is marked as looping and when said current path vector is marked as looping then consideration of the current path vector is complete;

when said current path vector is not marked as looping then determining if a second path vector has a first element equal to the last element of the current path vector;

when said second path vector has a first element equal to the last element of the current path vector, then marking the current path vector as looping and marking the second path vector as looping;

when said second path vector does not have a first element equal to the last element of the current path vector, then marking the second path vector as loopfree and marking the current path vector as loopfree;

determining if all path vectors have a label;

when all path vectors have a label then terminating the marking process; and when all path vectors do not have a label then designating an unlabeled vector as the current vector and repeating said steps of determining if the current path vector is marked as looping, determining if a second path vector has a first element equal to the last element of the current path vector, and said determining if all path vectors have a label.

21. A system for label switch routing providing fast rerouting in a network comprising:

means for assigning a first local label for an address prefix;
means for assigning a second local label for said address prefix;
means for advertising said first local label to an upstream peer;
means for advertising said second local label to a downstream peer; and means for switching a forwarding entry from said first local label for said address prefix prefix to said second local label for said address prefix when a failure of a link or next hop is detected;

wherein the first local label and the second local label are distinct; and wherein the first local label designates a normal path towards a destination router indicated by said address prefix, while the second local label indicates an alternate path towards the destination router indicated by said address prefix.

22. The system of claim 21 further comprising:

means for learning a label for said address prefix from said upstream peer;

means for a label for said address prefix from said downstream peer;

means for installing said first local label for said address prefix and said label learned from said upstream peer into a forwarding data structure;

means for installing said second local label for said address prefix and said label learned from said downstream peer into said forwarding data structure; and means for inspecting and correcting looping paths occurring in path vectors for upstream paths.

23. The system of claim 22 wherein said means for correcting and inspecting looping paths comprises:

means for inspecting at a router the set of path vectors received from upstream routers;

means for determining if the router appears in more than one path vector;

means for when said router does not appear in more than one path vector then determining there is no loop; and means for when said router appears in more than one path vector then creating a new set of truncated vectors, said creating a new set of vectors comprising:

means for removing the router and any router that follows said router in the path vector; and means for using a marking scheme to trace a path that traffic follows when said router fails.

24. The system of claim 23 wherein said means for using a marking scheme comprises:

means for selecting a path vector as a current path vector;

means for determining if the current path vector is marked as looping and when said current path vector is marked as looping then consideration of the current path vector is complete;

when said current path vector is not marked as looping then means for determining if a second path vector has a first element equal to the last element of the current path vector;

when said second path vector has a first element equal to the last element of the current path vector, then means for marking the current path vector as looping and marking the second path vector as looping;

when said second path vector does not have a first element equal to the last element of the current path vector, then means for marking the second path vector as loopfree and marking the current path vector as loopfree;

means for determining if all path vectors have a label;

when all paths vectors have a label then means for terminating the marking process; and when all path vectors do not have a label then means for designating an unlabeled vector as the current vector and means for repeating said determining if the current path vector is marked as looping, said determining if a second path vector has a first element equal to the last element of the current path vector, and said determining if all path vectors have a label.

25. The system of claim 21 wherein said means for assigning a second local label for said address prefix comprises:

means for determining a set of path vectors having a merge point closest, measured in hops, to a destination router with a path defined by said first local label; and means for selecting, from said set of path vectors, a selected path vector having the fewest number of hops to a destination device.

\* \* \* \* \*

UNITED STATES PATENT AND TRADEMARK OFFICE
CERTIFICATE OF CORRECTION

PATENT NO. : 7,609,620 B2
APPLICATION NO. : 11/203801
DATED : October 27, 2009
INVENTOR(S) : Alex E. Raj et al.

It is certified that error appears in the above-identified patent and that said Letters Patent is hereby corrected as shown below:

In the Claims

In Column 14, line 14, delete "an" and insert --said--.

In Column 14, line 31, delete "the" and insert --said label switch--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,609,620 B2
APPLICATION NO. : 11/203801
DATED : October 27, 2009
INVENTOR(S) : Raj et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Twelfth Day of October, 2010

David J. Kappos
*Director of the United States Patent and Trademark Office*